July 28, 1959     H. R. MOY ET AL     2,896,885
PARACHUTE RIPCORD GRIP RETAINER
Filed March 29, 1957

INVENTORS
HAMMOND R. MOY
WILLIAM H. SHOCKEY
SYLVAN E. PORTER
BY
ATTORNEYS 2,896,885

PARACHUTE RIPCORD GRIP RETAINER

Hammond R. Moy, Torrance, Calif., William H. Shockey, Silver Spring, Md., and Sylvan E. Porter, El Centro, Calif., assignors to the United States of America as represented by the Secretary of the Navy Application March 29, 1957, Serial No. 649,581

3 Claims. (Cl. 244—149)

(Granted under Title 35, U.S. Code (1952), sec. 266)

The invention described herein may be manufactured and used by or for the Government of the United States of America for governmental purposes without the payment of any royalties thereon or therefor.

This invention relates to quick disconnect devices, and more particularly to a parachute ripcord grip disconnect which cannot be released accidentally by the large dynamic forces occurring during high speed ejection.

Many types of disconnects have been devised for restraining a parachute ripcord grip until intentional release by the jumper. In most instances, the ripcord grip is secured to some part of the parachute harness by an elastic webbing band or confined in a fabric pocket, such as disclosed in U.S. Patent No. 2,406,209. It has been found that in present day high speed ejection seat bail out the grip can be accidentally blown out of the fabric-type retainers causing a premature parachute opening, which at high speed results in destruction of the parachute, and possible injury to the jumper by shock or because of the lack of oxygen at high altitudes.

The invention parachute grip disconnect is essentially a clip constructed of resilient sheet material having channels forming an open end to receive and clasp a mating grip enabling expeditious assembly and disassembly.

A principal object of this invention is to provide a quick disconnect which will separate only upon a predetermined force applied in a particular direction.

Other objects are to provide a parachute ripcord disconnect which is light weight, simple, and inexpensive to manufacture.

Other objects and many of the attendant advantages of this invention will be readily appreciated as the same becomes better understood by reference to the following detailed description when considered in connection with the accompanying drawings wherein.

Figure 1:
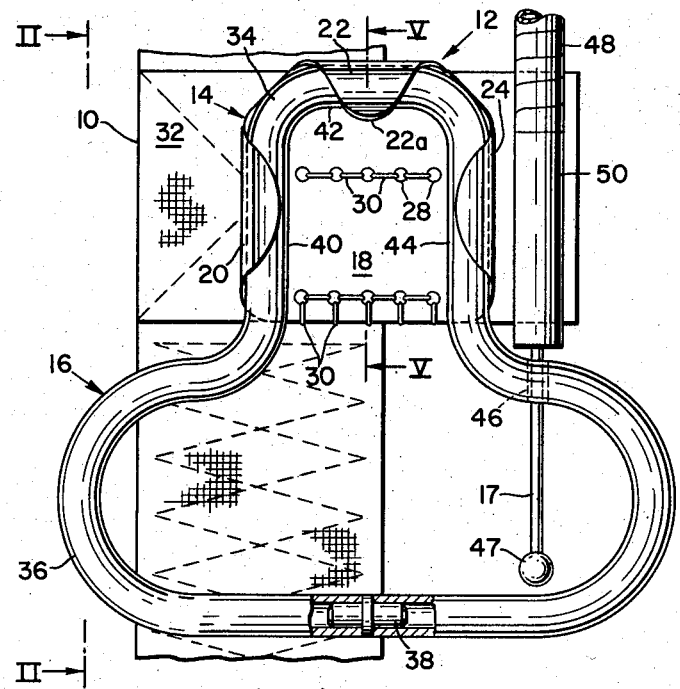
Fig. 1 is a partial top plan view of a parachute harness on which is supported the assembled ripcord grip and retainer of this invention, a portion of the grip being broken away to show details of construction.
Figure 4:
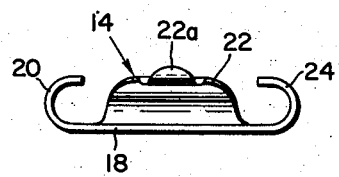
Fig. 4 is an end elevation view of the clip after bending.

Referring to the drawing where like reference numerals designate like or corresponding parts throughout the several views, there is shown generally in Fig. 1 a portion of a harness strap 10 of a conventional parachute supporting a quick disconnect 12 which forms the subject matter of this invention. Disconnect 12 consists essentially of two separable members, a retainer member 14 adapted to be secured to harness strap 10, and a parachute ripcord grip 16 attached to a ripcord 17 of a parachute, not shown.

Figure 3:
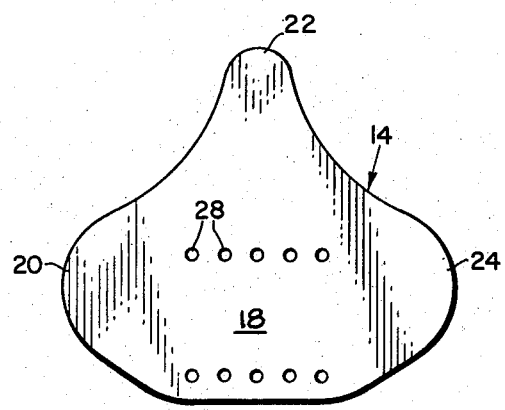
Fig. 3 is a plan view of a clip blank prior to bending.
Figure 5:
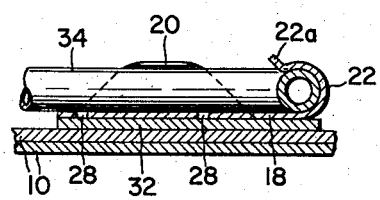
Fig. 5 is a sectional view of the assembled ripcord grip and clip taken along line V—V of Fig. 1.

Retainer member 14 is essentially a clip preferably constructed of sheet material. For example, a heat treated corrosion resistant steel having a thickness of .015 inch and identified as AMS–5528 has been found to be satisfactory for use on parachutes. Clip 14 is developed from a flat blank, shown in Fig. 3, being cut from suitable sheet material, the blank being formed with a base portion 18 having at three clover leaf-like side portions 20, 22, and 24 which are formed into corresponding semicylindrical or channel portions identified by the same reference characters. At least one side of the clip blank is not provided with a leaf portion so that an entrance is provided to the channels after the clip is formed longitudinally to receive the grip. As will be noted from Figs. 1 and 3, the free ends of the leaf portions overhanging base portion 18 are rounded to provide a camming action in the assembly of the grip therein. At least one of the channel portions, preferably 22 opposite the clip entrance, is also provided with a spring detent portion 22a to clasp the grip when assembled to the clip.

Figure 2:
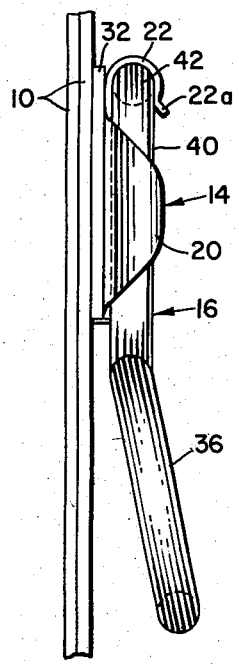
Fig. 2 is a side elevation view of Fig. 1 taken in the direction of line II—II.

Base portion 18 of the clip is provided with several rows of apertures 28 for attaching the clip to harness strap 10 by stitching 30 or other suitable means. As shown in Figs. 1 and 2, a transverse fabric strip 32 may be inserted between clip 14 and strap 10 to reinforce the mounting and to support ripcord 17.

Parachute ripcord grip 16 is made of a rod bent into the configuration of an inverted T and comprises a retainer portion 34 and a transverse handle portion 36. The grip rod member is preferably of tubular stock to effect a savings of weight, the ends of the rod being joined together at the handle portion by a rod insert 38 welded therein. Retainer portion 34 consists of a pair of parallel leg portions 40, 44, and an integral end portion 42, each leg portion adapted to be engaged by one of the clip channels. End portion 42 is clasped by detent 22a which restrains disassembly until subjected to a predetermined pull, i.e., a force of 15±2 pounds has been found to be satisfactory for use in parachutes. A supplemental restraining force can be obtained by bending channels 20 and 24 to various diameters less than that of the respective leg portions of the grip so that they are resiliently engaged to the desired extent.

Handle portion 36 is of a sufficient width to accommodate the clenched hand of the user and lies in a plane canted from a plane containing retainer portion 34, see Fig. 2, to allow sufficient space between the handle portion and the harness strap 10 to accommodate the user's fingers. One side of the grip handle portion 36 is drilled at 46 for the passage of ripcord 17, the end of which terminates in round stop portion 47 having a diameter larger than passage 46 to transmit the releasing force. Stop portion 47 being spaced from passage 46 provides some play or movement between the grip and clip before the parachute is released. Ripcord 17 is threaded through a flexible tubing 48 terminating in a ferrule 50 secured to strip 32 in a suitable manner.

The operation of the grip disconnect is readily apparent from Figs. 1 and 2. Grip 16 is normally clasped in clip 14 by spring detent 22a engaging leg portion 42, until a predetermined pull parallel to channels 20 and 24 is exerted by the user on the handle portion. Channels 20 and 24 function to guide the grip during assembly and disassembly, and provide additional clasping action if needed.

The invention disconnect provides a positive restraining means for releasing a parachute grip upon a predetermined force, preventing accidental release of the parachute and the inherent casualties. The parachute grip is firmly supported in the clip yet readily separated by the user when the occasion arises.

Obviously many modifications and variations of the present invention are possible in the light of the above teachings. It is therefore to be understood that within the scope of the appended claims the invention may be practiced otherwise than as specifically described.

We claim:

1. In a parachute having a harness and ripcord, a quick disconnect comprising a clip member and a ring-like grip member releasably attached therein, said grip member being connected to said ripcord and including an attaching portion and an integral handle portion, said handle portion being of a size to receive the entire hand of the user for pulling the ripcord, said clip member being made of resilient sheet material having a base portion for attachment to said harness, said base portion having an open-ended pocket formed by channels having free ends overhanging and spaced from said base portion slidably to receive corresponding lateral portions of the attaching portion of said grip member along a plane parallel to said base portion, at least one of said free ends being a spring detent resilient to clasp a corresponding portion of said grip member to prevent accidental separation during descent.

2. In a parachute having a harness and a ripcord, a quick disconnect comprising a clip member and a ring-like grip member releasably attached therein, said grip member being connected to said ripcord and including an attaching portion and an enlarged handle portion said handle portion being of a size to receive the entire hand of the user for pulling the ripcord, said clip member being made of resilient sheet metal having a base portion for attachment to said harness, said base portion having an open-ended pocket formed by channels on three sides thereof, said channels having free edges overhanging and spaced from the base portion to slidably receive corresponding lateral portions of the attaching portion of the grip member along a plane parallel to said base portion, at least said free end opposite the open end of the pocket being a spring detent resilient to clasp said corresponding portion of the grip member to prevent accidental separation during descent.

3. In combination with a parachute having a harness and a ripcord, a quick disconnect comprising a clip member and a ring-like grip member releasably secured therein, said grip member being connected to said ripcord and including an enlarged handle portion, said handle portion being of a size to receive the entire hand of the user for pulling the ripcord, said clip being made of resilient sheet material and having a perforated base portion for threaded attachment to the harness, said base portion having an open-ended pocket formed by channels on at least three sides thereof, said channels having free ends overhanging and spaced from said base portion slidably to receive corresponding lateral portions of said grip member in a plane parallel to said base portion, said base portion being secured to said harness with the open end of the pocket directed downward in the direction of descent, said free ends being detents resilient to clasp corresponding portion of said grip member to prevent accidental separation during descent.

References Cited in the file of this patent

UNITED STATES PATENTS

| | | |
|---|---|---|
| 1,261,649 | Thomas | Apr. 2, 1918 |
| 2,042,466 | Hoffman | June 2, 1936 |
| 2,200,047 | Tinnerman | May 7, 1940 |

FOREIGN PATENTS

| | | |
|---|---|---|
| 493,958 | Great Britain | Oct. 18, 1938 |
| 671,119 | Great Britain | Feb. 1, 1939 |